(No Model.)
C. H. TRASK.
UNDERGROUND ELECTRIC WIRE CONDUIT.
No. 293,688. Patented Feb. 19, 1884.
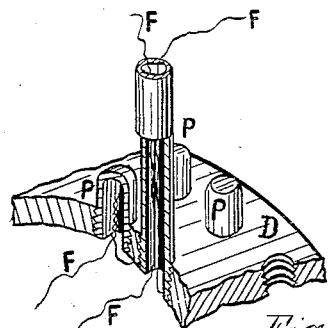
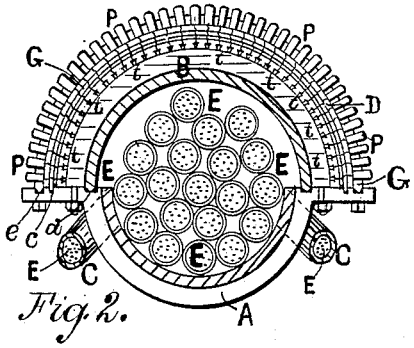
Fig. 2.
Fig. 4.
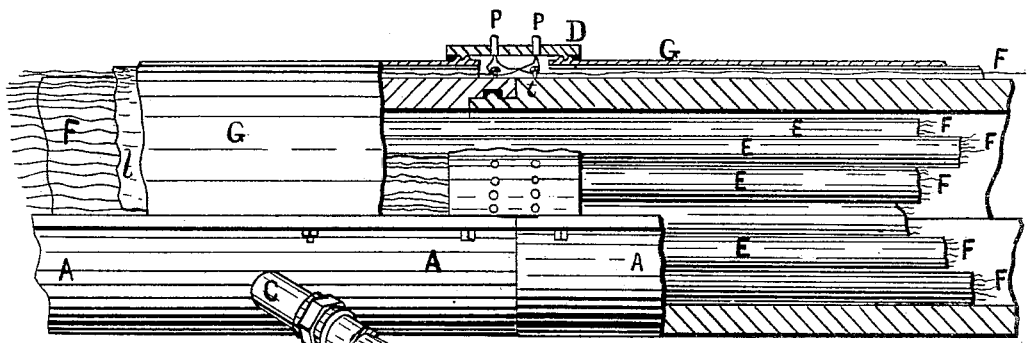
Fig. 1.
Fig. 5.
Fig. 6.
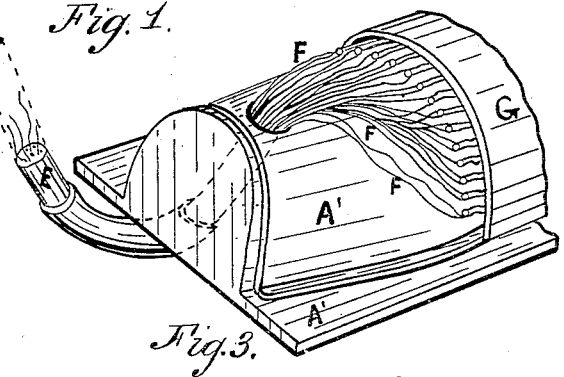
Fig. 3.
Witnesses:
Chas. S. Gooding
N. E. Leavitt
Inventor:
Charles H. Trask
By Sylvanus Walker
ATTORNEY

UNITED STATES PATENT OFFICE.

CHARLES H. TRASK, OF LYNN, MASSACHUSETTS.

UNDERGROUND ELECTRIC-WIRE CONDUIT.

SPECIFICATION forming part of Letters Patent No. 293,688, dated February 19, 1884.

Application filed June 22, 1883. (No model.)

*To all whom it may concern:*

Be it known that I, CHARLES H. TRASK, of Lynn, in the county of Essex and State of Massachusetts, have invented certain new and useful Improvements in Underground Electric-Wire Conduits, of which the following is a specification.

The object of my invention is to provide a compact, convenient, and efficient conduit for underground telegraph or electric wires, whereby the objections heretofore existing in similar conduits are fully overcome; and it consists in the construction, combination, and arrangement of the several parts of the apparatus, as hereinafter more fully described, and set forth in the claims.

Figure 1 represents a sectional perspective view of a conduit for underground electrical wires constructed according to my invention. Fig. 2 represents a vertical cross-section of the same. Fig. 3 represents a perspective view of a portion of the same. Fig. 4 represents a similar view of a portion drawn upon an enlarged scale. Figs. 5 and 6 are similar views of portions of the same enlarged.

A represents the bottom portion of the conduit, which may be formed semicircular, as shown in Figs. 1 and 2, or flat, as shown in Fig. 3, and provided with flanges, as shown in Fig. 2, which flanges or bottom portions are provided with longitudinal grooves $a\ c\ e$, the inward grooves, $a$, being adapted to receive a corresponding tongue formed upon the lower edge of the upper half or semicircular top portion, B, said tongue and grooves being provided with suitable cement, so that when placed together their connection may be made air-tight and held in position by suitable screw-bolts inserted in said parts or flanges, as shown, the bottom or lower portion of the conduit being laid in an excavation formed in the ground and properly cemented or coated, to prevent decay or oxidation, and provided at desired intervals with branch or connecting tubes C, adapted to extend a line of electric wires, E, into a cross or branch street, as shown in Figs. 1 and 3. The lower portion or base longitudinal section of the conduit being thus constructed and arranged, the interior or base portion is provided with a series of insulated wires, F, formed into insulated cables, and a series of said cables, E, are placed therein, as shown in Figs. 1 and 2. These cables are extended within the said bottom portion, A, any desired distance, or to such point as a branch may be required when a connection is made through tube C, as shown, and one of said cables E is turned or deflected outward from the main conduit through this tube C and carried into the branch conduit A', as shown in Fig. 3, where it will be seen that the insulated electric wires F are separated and spread out upon the upper surface of the convex top portion, B, which may be galvanized or coated with an insulating substance and provided with a series of projecting insulators, $t$, to which the said electric wires F may be secured in any desired manner, and then the said wires may be covered over with a jacket of lead, $l$, or other suitable non-conducting material, placed thereon. Then the outer casing, G, is placed thereon, its lower edges being received within the outward groove $e$ of the base or lower portion, A, as shown in Fig. 2, and cemented air-tight. Now, in order to allow a single line of said insulated electric wires F to be carried into a building for the purpose desired, I have constructed and arranged at intervals, or at the joints of the pipe or conduit A B, a semicircular retaining-band or cap-piece, D, which is provided with two lateral rows or series of openings provided with a screw-thread and cap, P, screwed therein. Within said capped hole or opening projects the ends of two insulated wires, forming a continuous line, whereby the said caps P may be unscrewed and the ends of the said insulated electric wires F connected with the ends of suitable electric wires, which are to be carried into a building or such point, as desired. These connecting-points of the said conduit are to be boxed up, and have a cover, which may be removed from the surface of the ground or street, so as to permit such opening and connections to be made without disturbing the main portion of the conduit.

It will be seen and understood that all the joints and connections are provided with proper tongues and grooves or other suitable means, so as to permit the same to be closed or sealed against the passage of water or air through the same.

Having thus described my invention, what I claim is—

1. An underground conduit provided with a series of insulated wire cables, and having one or more of said cables extended outward therefrom, and carried into a separate conduit, and having the insulated wires thereof separated and connected with a series of insulators, and extended beneath a casing and outward through a perforated cap-piece, substantially as described, as and for the purposes set forth.

2. The combination, with the conduit A B, of the outer casing, G, and perforated cap-piece D, as and for the purposes set forth.

3. The combination, with the conduit A B, of the insulated wire cables E, insulated wires F, insulators $t$, lead jacket $l$, casing G, perforated cap-piece D, and connecting-tubes C, constructed and arranged substantially as described, as and for the purposes set forth.

CHARLES H. TRASK.

Witnesses:
SYLVENUS WALKER,
CHAS. S. GOODING.